United States Patent [19]

Hiraiwa et al.

[11] 4,393,285

[45] Jul. 12, 1983

[54] TRANSMISSION SWITCH ARRANGEMENT FOR A POWER TRANSMISSION RESPONSIVE TO SHIFTING OF GEAR POSITION

[75] Inventors: Kazuyoshi Hiraiwa, Yokohama; Saburo Yamasaki, Fujisawa, both of Japan

[73] Assignee: Nissan Motor Co., Ltd., Yokohama, Japan

[21] Appl. No.: 260,699

[22] Filed: May 5, 1981

[30] Foreign Application Priority Data

May 6, 1980 [JP] Japan ................................ 55-58578

[51] Int. Cl.³ .............................................. H01H 9/06
[52] U.S. Cl. ................................ 200/61.88; 200/61.91
[58] Field of Search .............. 200/61.91, 61.88, 61.28, 200/4; 340/52 R, 70

[56] References Cited

U.S. PATENT DOCUMENTS

| 1,979,836 | 11/1934 | Kryzer ........................ 200/61.88 X |
| 4,158,404 | 6/1979 | Yamashita et al. ................ 192/3.58 |

FOREIGN PATENT DOCUMENTS

| 1158829 | 7/1969 | United Kingdom . |
| 1383752 | 2/1975 | United Kingdom . |
| 1544240 | 4/1979 | United Kingdom . |

*Primary Examiner*—A. T. Grimley
*Assistant Examiner*—Morris Ginsburg
*Attorney, Agent, or Firm*—Thompson, Birch, Gauthier & Samuels

[57] ABSTRACT

A switch arrangement comprises a movable switch member movable corresponding to shifting of transmission gear position and a stationary switch member including a plurality of contacts housed in a single member. The contacts are arranged to be adapted to respective transmission gear position and connectable with the movable switch member for electrical communication.

12 Claims, 5 Drawing Figures

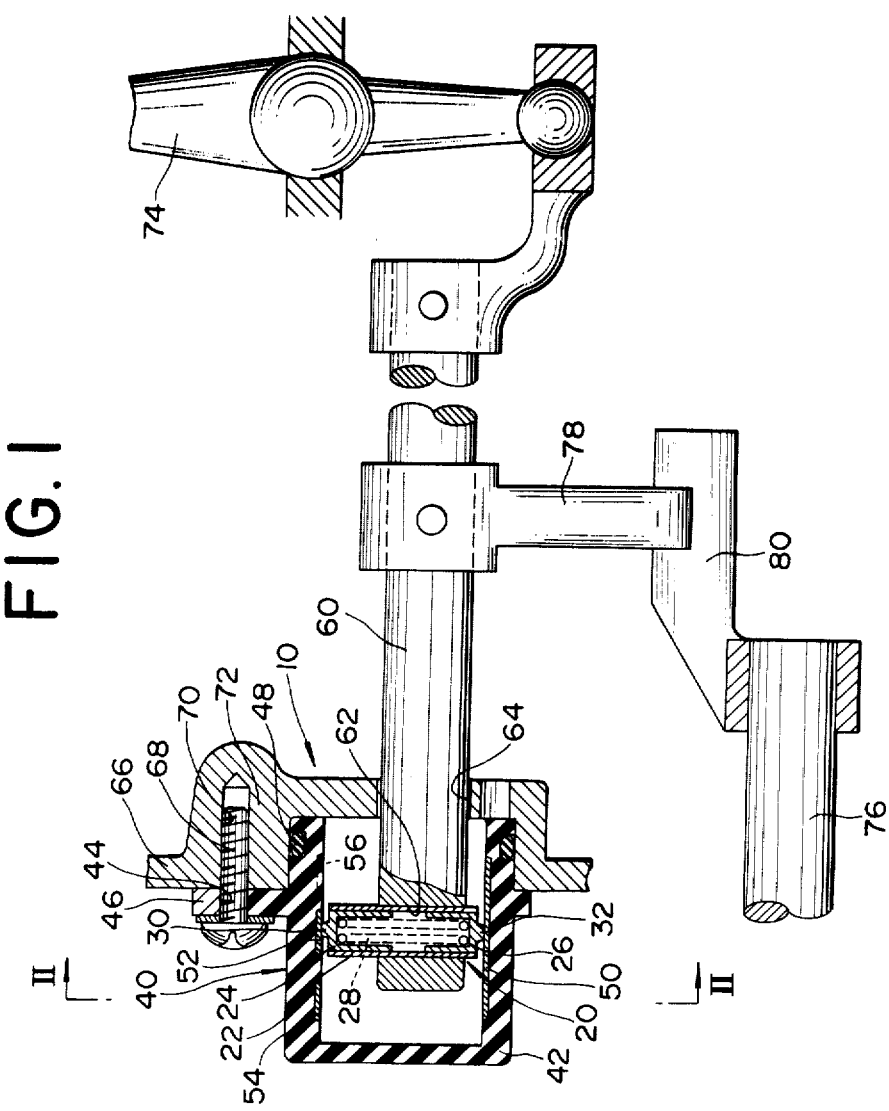

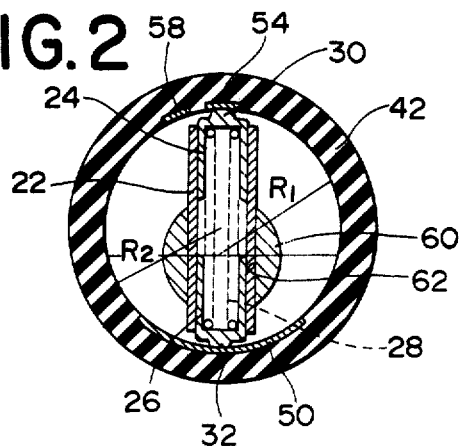
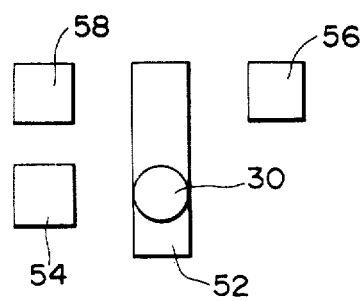
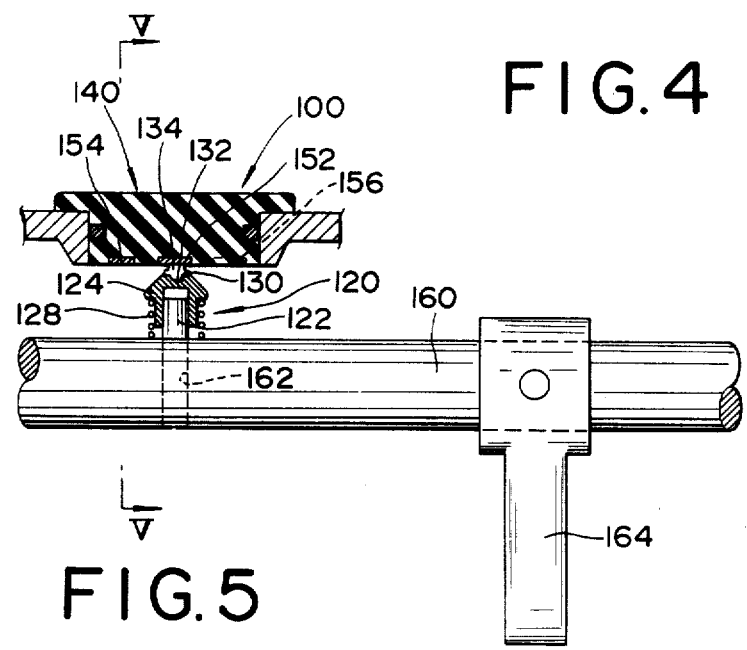
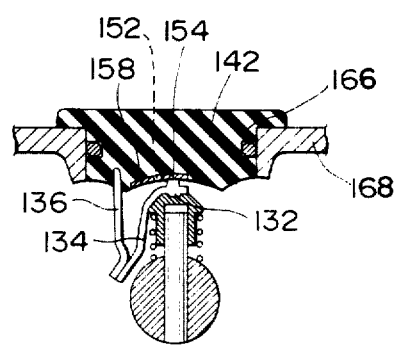

TRANSMISSION SWITCH ARRANGEMENT FOR A POWER TRANSMISSION RESPONSIVE TO SHIFTING OF GEAR POSITION

BACKGROUND OF THE INVENTION

The present invention relates generally to a transmission switch arrangement being variable, the switch position thereof corresponding to the gear position of a power transmission. More specifically, the invention relates to a compact transmission switch arrangement which can be sufficiently small-sized for conveniently mounting on a transmission housing.

As is well known, it has been required to detect the transmission gear position for controlling a spark ignition timing and for operating a warning system for reverse driving of an automotive vehicle. For detecting the transmission gear position, a switch arrangement is provided to the transmission for varying the switch position corresponding to the transmission gear positions. Conventionally, a plurality of switch arrangements are provided to the transmission respectively adapting to respective transmission gear positions. This leads to drawbacks that require a lot of parts for assembling into the required numbers of the switch arrangement and that complicates the transmission construction.

SUMMARY OF THE INVENTION

Therefore, it is an object of the present invention to provide a transmission switch compact enough to mount on the transmission housing.

Another and a more specific object of the invention is to provide a transmission switch arrangement adapted for varying the switch position corresponding to variable transmission gear positions.

To accomplish the above-mentioned and other objects, a switch arrangement, according to the present invention, comprises a movable switch member movable corresponding to the shifting of the transmission gear position and a stationary switch member including a plurality of contacts housed in a single member. The contacts are arranged to be adapted to respective transmission gear positions and connectable with the movable switch member for electric communication.

According to one embodiment of the invention, there is provided a transmission switch arrangement for a power transmission comprising a movable switch member secured on a striking rod for cooperation with a shift lever, which movable switch member includes a movable contact, and a stationary switch member secured on a transmission housing, which stationary switch member that includes a plurality of stationary contacts respectively adapting to respective transmission gear positions, said stationary contacts being housed in a single member.

BRIEF DESCRIPTION OF THE DRAWINGS

The present invention will become more fully understood from the detailed description given hereinbelow and from the accompanying drawings of the preferred embodiment of the present invention, which however, should not be taken as limitative of the present invention but for elucidation and explanation only.

In the drawings:

FIG. 1 is a longitudinal section of a preferred embodiment of a transmission switch arrangement according to the present invention;

FIG. 2 is an enlarged transverse section of the switch arrangement taken along line II—II of FIG. 1;

FIG. 3 is an illustration showing an arrangement of stationary contacts in the switch arrangement of FIG. 1;

FIG. 4 is a longitudinal section of another embodiment of the transmission switch arrangement according to the present invention;

FIG. 5 is an enlarged transverse section of the switch arrangement of FIG. 4 taken along line V—V of FIG. 4.

DESCRIPTION OF THE PREFERRED EMBODIMENT

Referring now to the drawings, particularly to FIGS. 1 and 2, there is illustrated a preferred embodiment of a switch arrangement mounted on a transmission housing, according to the present invention. The switch arrangement 10 generally comprises a movable switch member 20 and a stationary switch member 40. The movable switch member 20 has a hollow tube 22 secured on a striking rod 60 adjacent the one end thereof. In the preferred embodiment, the striking rod 60 is formed with a through opening 62 for receiving the hollow tube 22. The hollow tube 22 extends through the through opening 62 and is positioned so that the rotational radius $R_2$ thereof is smaller than the radius $R_1$.

Movable contact elements 24 and 26 are respectively received in the longitudinally extending hollow interior of the hollow tube 22 in slidable position. A spring 28 is disposed within the hollow tube and between the movable contact elements 24 and 26 for maintaining therein spaced relationship. The movable contact elements 24 and 26 respectively have contact sections 30 and 32 respectively protruding from the ends of the hollow tube 22.

The stationary switch member 40 includes a switch box 42 receiving the movable switch member 20 together with the end of the striking rod 60. The striking rod 60 extends through an opening 64 formed in a transmission housing 66. The switch box 42 is secured on the transmission housing 66 with a screw 68 passing through an opening 44 formed in the flange section 46 of the switch box 42 and engaged with a threaded bore 70 formed in the boss section 72. The switch box 42 is provided with a sealing ring 48 on the outer periphery, which sealing ring 48 abuts the transmission housing 66 for a seal therebetween.

The switch box 42 is equipped with stationary contacts 50, 52, 54, 56 and 58 on the internal periphery thereof. The stationary contact 50 is connected with an electric power source (not shown) for supplying electric power to the switch arrangement. The contacts 52, 54, 56 and 58 are arranged as shown in FIG. 3 and respectively adapted to respective transmission gear positions. Namely, the contact 52 is adapted to the neutral gear position, the contact 54 is adapted to the fourth speed gear position, the contact 56 is adapted to the over-drive gear position and the contact 58 is adapted to the reverse gear position. The contact section 30 of the movable contact element 24 contacts either one of the contacts 52, 54, 56 and 58 corresponding to the transmission gear position.

It will be appreciated that the hereabove shown and described embodiment shows an example of the arrangement of the contacts applied for the front five speed transmission, however, the present invention is applicable for any transmission with necessary modification of the arrangement. Further, it is possible to establish electric communication between the contact elements 24 and 26 by a lead disposed within the tube 22. It is also possible to form the tube out of electrically conductive material for communication between the contact elements 24 and 26.

In the meanwhile, the stationary contacts 52, 54, 56 and 58 are respectively connected to the devices such as the ignition timing control system, the warning system for reverse driving and so on in per se well known manner.

Returning to FIG. 1, the striking rod 60 is cooperatively connected with a transmission shift lever 74. Also, the striking rod 60 is connected to a folk rod 76 via a shifter 78 and a fold bracket 80. The folk rod 76 is connected to the transmission gear system via known synchromechanism.

In operation, the striking rod 60 is moved in response to shifting operation of the shift lever 74. Corresponding to the striking rod 60 motion, the movable switch member 20 is varied in position to establish communication between the contact section 30 and either one of contacts 52, 54, 56 and 58. Upon motion of the movable switch member 20, the movable contact elements 24 and 26 are resiliently urged toward the contacts 50, 52, 54, 56 and 58 respectively, opposing thereto with the elastic force of the spring 28 for assuring electric communication therebetween. On the other hand, since the radius $R_1$ is larger than the radius $R_2$, the motion distance of the contact section 30 becomes larger in relation to the rotation to the rotation angle of the striking rod 60 for accuracy of switching in response to shifting of the gear position.

Referring to FIGS. 4 and 5, there is shown another embodiment of the switch arrangement according to the present invention. In this embodiment, the switch arrangement 100 generally comprises a movable switch member 120 and a stationary switch member 140. The movable switch member 120 includes a pin 122 received in an opening 162 of a striking rod 160 at one end thereof and a movable contact element 124. A coil spring 128 is wound on the other end of the pin 122 protruding from the striking rod 160 via the movable contact element 124. The coil spring 128 urges the movable contact element 124 in the direction away from the striking rod 160. The movable contact element 124 has a top recess 130. A projection 132 formed adjacent to one end of an elastic and electrically conductive member 134 is engaged in the top recess 130. The conductive member 134 is elastically connected to another electrically conductive member 136 at end thereof, as shown in FIG. 5. The other end of the conductive member 136 is secured to contact holder 142, which conductive member 136 is in turn connected to a power source (not shown). The contact holder 142 is received in an opening 166 of a transmission housing 168. On the surface of the contact holder 142 opposite the movable contact element 124 are equipped contacts 152, 154, 156 and 158. The contacts 152, 154, 156 and 158 are respectively adapted to respective transmission gear positions as in the preceding embodiment.

Similarly as in the foregoing embodiment, the striking rod 160 is interpositioned between the shift lever (not shown) and the folk rod via shifter 164.

As illustrated hereabove, the present invention can fulfill all of the objects and advantages sought thereto.

What is claimed is:

1. A transmission switch arrangement for detecting a transmission gear position of a power transmission comprising:
   a transmission housing;
   a switch body secured to said transmission housing;
   a striking rod interpositioned between a transmission gear assembly and a shift lever for shifting the operation of transmission gears according to the movement of the shift lever;
   a movable switch member secured on said striking rod for cooperation with said shift lever, which movable switch member includes a movable contact; and
   a stationary switch member secured in said switch body, which stationary switch member includes a plurality of stationary contacts, one of said stationary contacts being in contact with said movable contact when said transmission is shifted to predetermined gear positions, in order to produce a signal indicative of the transmission gear position.

2. A transmission switch arangement for detecting a transmission gear position of a power transmission, comprising:
   a transmission housing;
   a switch body secured to said transmission housing;
   a striking rod connecting a shift lever and a transmission gear assembly for shifting operation of transmission gear positions in response to operation of said shift lever, said striking rod extending in substantially parallel relationship with one surface of said switch body and movable in relation thereto;
   a movable switch member secured on said striking rod for cooperation with said shift lever and including a movable contact protruding towards said surface of said switch body;
   a stationary switch member including a plurality of stationary contacts which are housed in said switch body with contacting surfaces exposed in said surface, which stationary contacts are arranged at locations respectively establishing electrical communication with said movable contact when the transmission gear assembly is shifted to the corresponding gear position, to produce a gear position signal indicative of the transmission gear position; and
   a spring associated with said movable contact to bias said movable contact toward said stationary contacts.

3. An arrangement as set forth in claim 1 or 2, wherein said switch body housing the stationary contacts is a hollow switch box secured on the transmission housing.

4. An arrangement as set forth in claim 3, wherein said movable contact is movably received in a hollow tube secured on the striking rod.

5. A transmission switch arrangement for detecting a transmission gear position to produce a gear position signal indicative of the transmission gear position in a power transmission, comprising:
   a transmission housing;
   a switch box secured to said transmission housing;

a striking rod connecting a shift lever and a transmission gear assembly for shifting operation of the transmission gear position in response to operation of said shift lever, said striking rod extending in substantially parallel relationship with the internal periphery of said switch box and movable in relation thereto;

a movable switch member secured on said striking rod for cooperation with a transmission gear shifting mechanism and disposed within said switch box, said movable switch member including a movable contact which opposes the internal periphery of the switch box; and stationary contacts secured on the internal periphery of said switch box at locations facing said movable contact, said stationary contacts being arranged at locations respectively corresponding to each respective transmission gear position.

6. An arrangement as set forth in claim 5, wherein said movable switch member comprises a cylindrical tubular member secured on said striking rod, a second movable contact, both movable contacts being slidably received within said tubular member, and a resilient member interpositioned between said contacts for urging them in a direction away from each other.

7. An arrangement as set forth in claim 6, wherein one of said contacts of the movable switch member is for connection to an electric power source for supplying power therethrough.

8. An arrangement as set forth in claim 5, wherein said movable switch member comprises a movable member slidably mounted on said striking rod and being urged toward said stationary contacts, said movable member including a contact section having an electrically conductive first member which is connected to an electrically conductive second member which is in turn used for connection to an electric power source.

9. An arrangement as set forth in claim 8, wherein said electrically conductive first and second member having a resilient force for urging themselves in the direction contacting respective ends thereof.

10. A transmission switch arrangement for detecting a transmission gear position of a power transmission, comprising:

a transmission housing;

a switch housing secured to said transmission housing;

a striking rod connecting a shift lever and a transmission gear assembly for shifting operation of the transmission gear position in response to operation of said shift lever, said striking rod extending through an internal space of said switch housing in substantially parallel relationship with one surface of said switch housing and movable in relation thereto;

a movable switch member secured on said striking rod for cooperation with said shift lever and including a movable contact resiliently biased towards said surface of said switch housing; and a stationary switch member including a plurality of stationary contacts which are housed in said switch housing with contacting surfaces exposed in said surface, which stationary contacts are arranged at locations such that one of said stationary contacts contacts said movable contact when the transmission gear assembly is shifted to the corresponding gear position, to produce a gear position signal indicative of the detected transmission gear position.

11. A transmission switch arrangement for detecting a transmission gear position in an automotive power transmission, comprising:

a transmission housing receiving therein a transmission gear assembly;

a switch housing fixedly secured to said transmission housing;

a striking rod for shifting said transmission gear assembly to a selected gear position;

a movable switch fixed to said striking rod and protruding therefrom;

a movable contact incorporated with said movable switch and resiliently biased toward an internal surface of said switch housing;

a resilient spring cooperating with said movable contact to provide the resilient force therefor;

a plurality of stationary contacts secured on said internal surface of said switch housing in an arrangement such that each of said stationary contacts corresponds to a predetermined gear position opposite said movable contact when the transmission gear assembly is shifted to a corresponding gear position.

12. A transmission switch arrangement for detecting a transmission gear position in an automotive power transmission, comprising:

a transmission housing receiving therein a transmission gear assembly;

a switch body fixed to said transmission housing;

a striking rod for shifting said transmission gear assembly to a selected gear position;

a movable switch fixedly secured to said striking rod for movement with the latter;

a movable contact incorporated with said movable switch and protruding therefrom toward an internal surface of said switch body;

a resilient spring cooperating with said movable contact and adapted to bias said movable contact toward said internal surface with a plurality of stationary contacts secured on said internal surface of said switch body in an arrangement according to a shift pattern of a shift lever in such a manner that each of said stationary contacts opposes said movable contact as said transmission gear assembly is shifted to corresponding gear positions to produce a gear position signal indicative of the corresponding transmission gear position.

* * * * *